Figure 1:
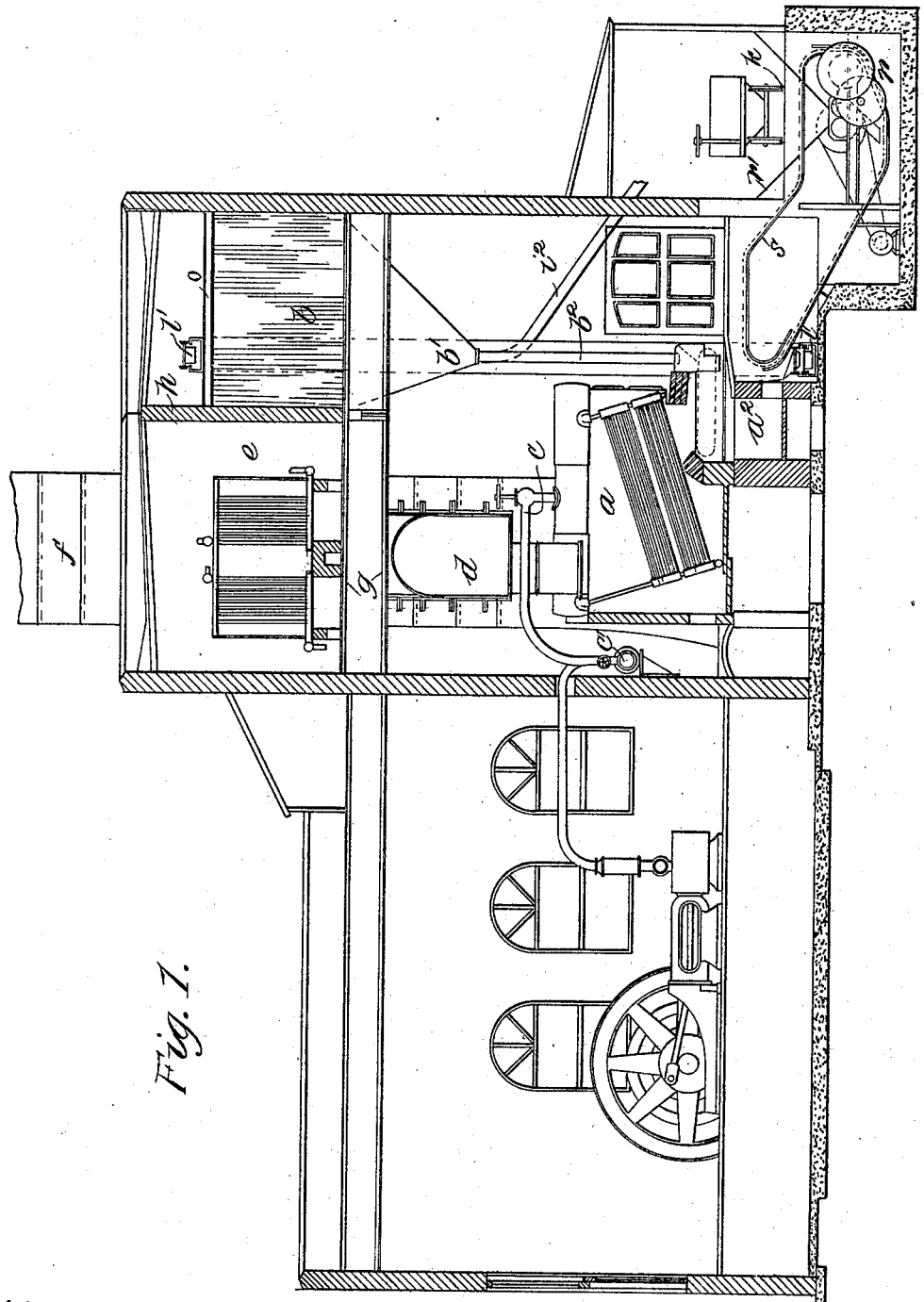

No. 647,033. Patented Apr. 10, 1900.
F. SARGENT.
POWER STATION SYSTEM.
(Application filed Sept. 29, 1899.)
(No Model.) 7 Sheets—Sheet 1.

Witnesses:
J. W. Kinkler
D. W. Danner

Inventor,
Frederick Sargent
By George P. Barton,
Attorney.

No. 647,033. Patented Apr. 10, 1900.
F. SARGENT.
POWER STATION SYSTEM.
(Application filed Sept. 29, 1899.)
(No Model.) 7 Sheets—Sheet 5.

Witnesses: Inventor,
Frederick Sargent,
By George P. Barton,
Attorney.

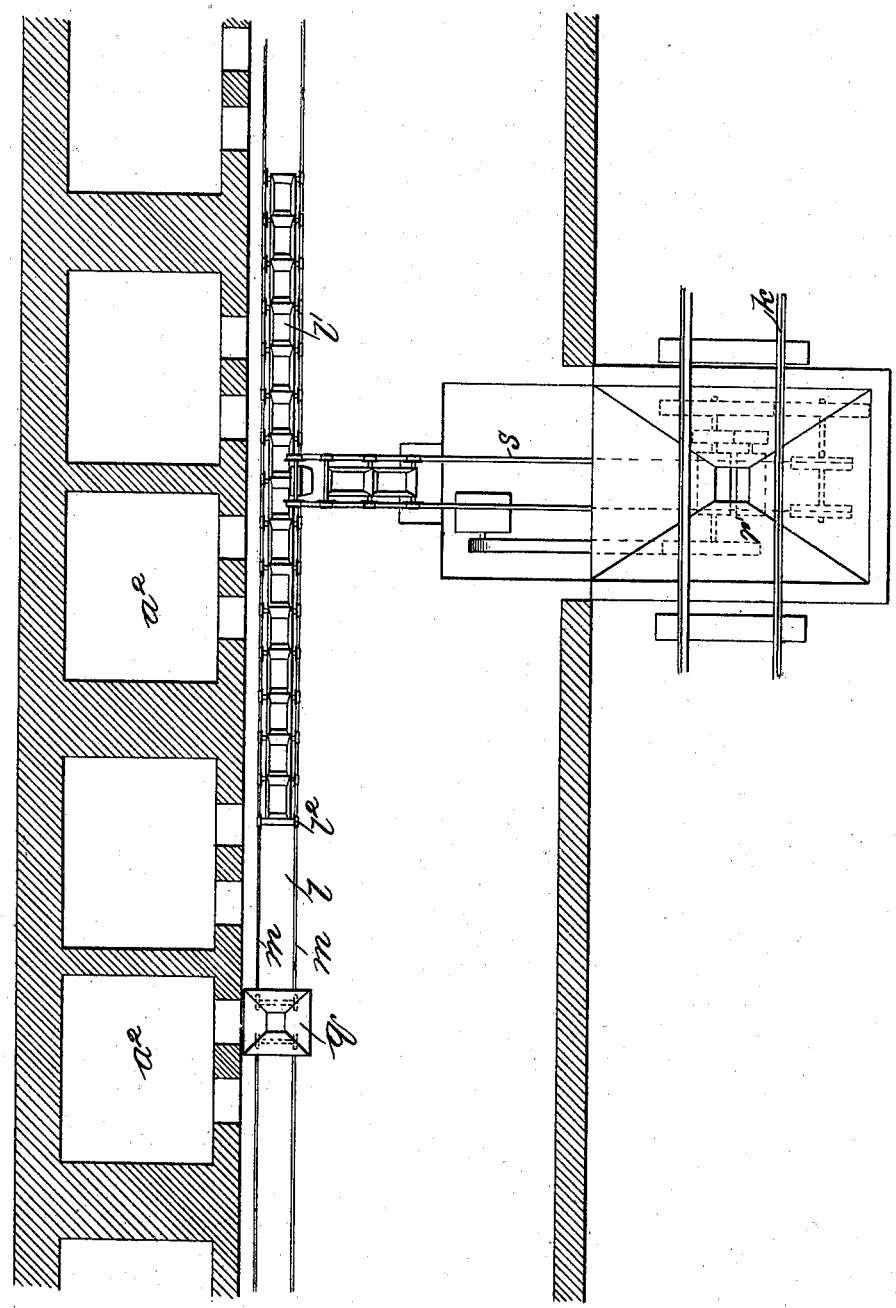

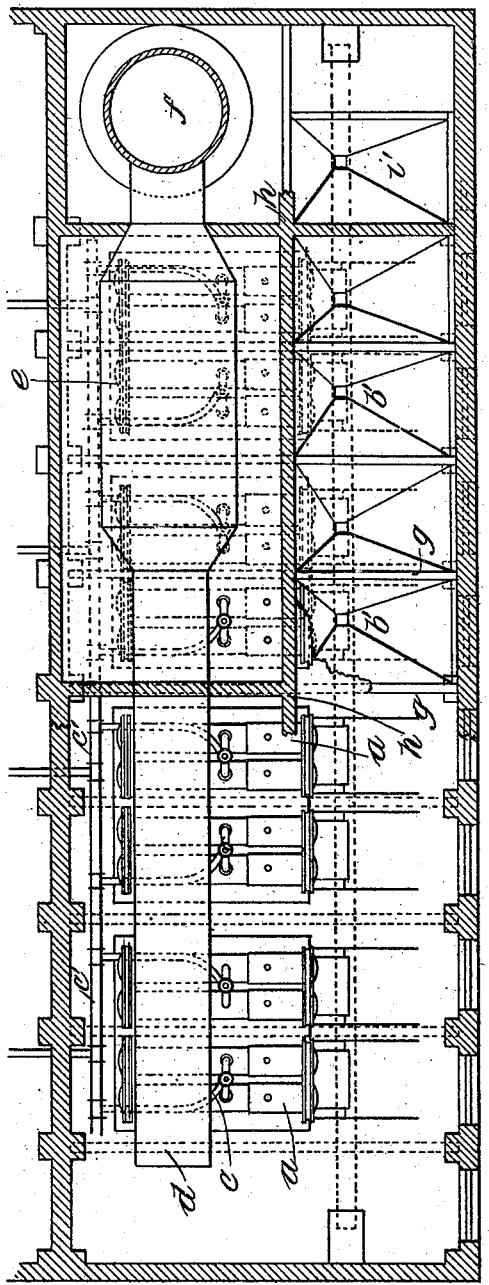

UNITED STATES PATENT OFFICE.

FREDERICK SARGENT, OF CHICAGO, ILLINOIS.

POWER-STATION SYSTEM.

SPECIFICATION forming part of Letters Patent No. 647,033, dated April 10, 1900.

Application filed September 29, 1899. Serial No. 732,101. (No model.)

*To all whom it may concern:*

Be it known that I, FREDERICK SARGENT, a citizen of the United States, residing at Chicago, in the county of Cook and State of Illinois, have invented a certain new and useful Improvement in Power-Station Systems, (Case No. 2,) of which the following is a full, clear, concise, and exact description.

My invention relates to a power-station system, and has for its object in general to improve the structure and design of steam-generating plants. More particularly it has been my purpose, first, to improve the construction and arrangement of the several parts, such as the coal-bunkers and feed-water-heater economizer and their supports, with a view to economizing the ground-space required for a large plant without sacrificing strength or convenience, and, secondly, to provide increased facilities for the storage and handling of large quantities of fuel and ashes.

I have found my invention to be of especial value in cities, where large power-stations whose output is thousands of horse-power of energy must be built upon small areas of land.

In a power-station embodying my invention the containing structure or boiler-house is preferably oblong in shape, having a width greater than the depth of the boilers from front to back plus the length required to draw the boiler-tubes. The boilers are then placed side by side upon the ground-floor of the boiler-house, forming a longitudinal row and leaving a passage wide enough to draw the boiler-tubes between the front of the boilers and the side of the building, in which attendants may walk to and fro. The boilers are preferably arranged in batteries, with two boilers to each battery. Above the boilers and parallel therewith a number of transverse beams or girders are provided, extending from supports in front of the row of boilers to supports at the rear thereof—that is, in the present case from wall to wall across the boiler-house. These beams or girders are located at intervals above the centers of the batteries of boilers and above the center lines between the batteries and may have their ends embedded in the side walls of the building. Additional supports for the girders may consist of pilasters or vertical enlargements of the side walls extending upwardly from the ground-floor to the bottoms of the ends of the girders. These girders divide the building into an upper and a lower story, forming a supporting-framework, upon which an upper floor may be constructed. A single partition is preferably built upwardly from the girders parallel with the side walls of the building, dividing the upper story longitudinally into two long narrow rooms. This partition is preferably built in a line above and near the forward ends of the row of boilers. One of the rooms thus formed is located above the space between the front of the row of boilers and the side wall of the building, and the other room is above the rear portion of the boilers, accessible to the flue carrying the smoke and heated products of combustion, and in this room I place the fuel-economizer. It should be stated, however, that the economizer-room does not necessarily extend the full length of the boiler-house. The room at the front is a bunker-room for storing the coal and ashes. The coal bunkers or funnels, which may be made of sheet iron, are suspended in the spaces between the girders at the bottom of the bunker-room, being fastened to the upper edges of the girders. The bottom of the bunker-room is thus comparted by the transverse girders, from which the funnels or bunkers are pendent. One end of the room is partitioned off for an ash-bunker.

Mechanical stokers of any approved type having troughs for receiving the coal which is to be stoked are preferably provided in connection with the boiler-furnaces, and coal chutes or pipes lead from the funnels of the coal-bunkers to the troughs of the mechanical stokers. The ash-bunker is connected with a chute or pipe leading to the exterior of the building, whereby it may be emptied.

The transverse beams or girders before referred to afford strong supports for the coal-bunkers and the fuel-economizer, forming a structure of great strength, as required to support the hundreds of tons of coal in the bunkers. The funnels are preferably in the shape of hollow inverted rectangular pyramids, whose bases are riveted or bolted to the upper edges of the girders and whose converging walls extend downwardly and are finally merged in the coal-chutes. The whole bottom of the bunker-room is therefore divided by the transverse girders into a series of rectangular compartments which form the mouths of the square funnels or bunkers. It will be appreciated that with this construction all of the coal which is contained in the bunker-room may be supplied to the mechanical stokers through the funnels and coal-chutes without the necessity of shoveling it in the bunker-room and without leaving any appreciable quantity in the bunker-room.

The fuel-economizer, which is located in the compartment above the rear of the boilers and receives the heated products of combustion from the boiler-furnaces, is simply a device for heating the feed-water for the boilers by utilizing the heat which would otherwise be carried off up the stack.

It has been customary heretofore to locate the fuel-economizer on the ground-floor of the power-station, since when put overhead great difficulty has been experienced in providing an adequate support which would not be inconvenient in the arrangement of boilers and machinery. Where the economizer has been put overhead, which is otherwise the most desirable location for it, it has heretofore been supported on columns extending upwardly from the floor of the boiler-room; but this arrangement has been unsatisfactory in many ways, since the columns are necessarily so placed as to interfere with the proper arrangement of the boilers and take up much valuable space in the boiler-room.

By my invention I have provided the beams or girders extending transversely entirely across the upper part of the boiler-room, requiring no columns or other supports except at the ends of the girders, and the economizer and coal-bunkers are afforded a secure support, permitting a very advantageous arrangement of the machinery. The location of the girders above the center line of each battery of boilers and above the center lines between the batteries is important in that it permits the mouths of the bunker-funnels to take up the entire spaces between the girders, and, further, permits the coal chutes or pipes to be centrally located with regard to the funnels and lead down directly to the troughs of the mechanical stokers. These girders further divide up the weight of the coal held in the bunkers and distribute it evenly throughout the structure.

The boilers are preferably so placed that the floor of the boiler-room will be on the level between the grate and the ash-pit, the ash-pit thus opening into the boiler-house basement. An endless conveyer, which is preferably of the type known to engineers as the "gravity-bucket-overlapping conveyer," extends completely around the boiler-house, passing through the basement below and in front of the openings of the ash-pits, up the side walls of the building, and along the roof of the bunker-room. Means are provided for driving the conveyer and for causing the same to discharge its freight at any point in the bunker-room.

A hopper may be mounted to travel to and fro in front of the openings in the ash-pits immediately above the conveyer, so that ashes may thus be raked from the pits directly into the hopper and so into the conveyer.

A railroad-track is preferably built outside of the building along near the side wall thereof, upon which cars may be run to bring coal and carry away ashes. At a convenient place a coal-crusher is preferably located underneath the railroad-track in a suitable excavation, a large hopper being built up from the coal-crusher, the walls of which hopper extend on either side of the railroad-track, so that coal may be unloaded from the cars into the hopper and so guided directly into the coal-crusher. The cross-conveyer, which may be of the same general nature as the main conveyer previously mentioned, serves to carry coal from the crusher up into the basement of the boiler-house, where it will transfer its freight to the main conveyer. It is evident, then, that the one main conveyer will serve at one time to carry coal received from the coal-crusher by way of the cross-conveyer up to the coal-bunkers and that at another time it may be utilized instead to carry the ashes up to the ash-bunker.

My invention will be more readily understood by reference to the accompanying drawings, in which—

Figure 2:
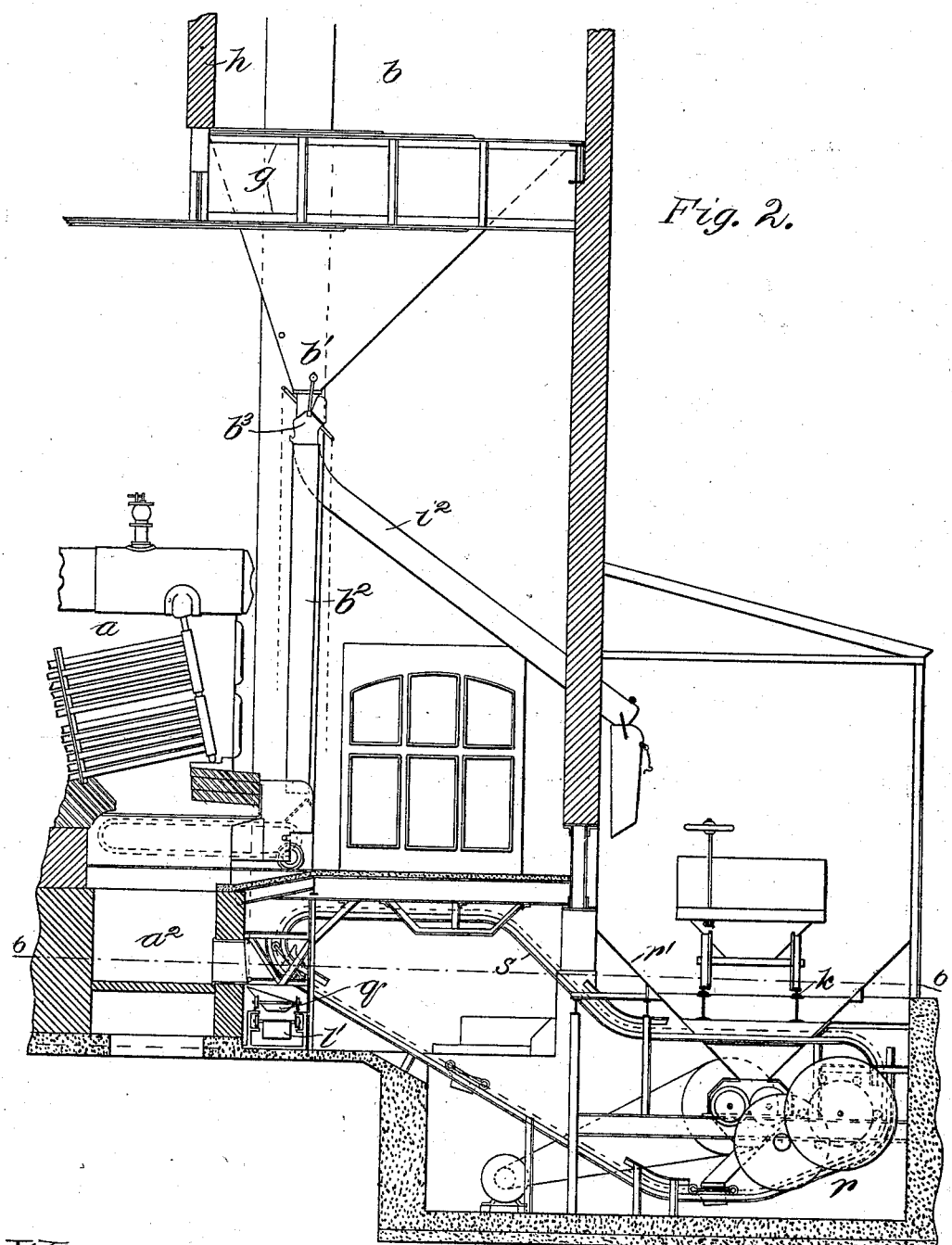
Figure 3:
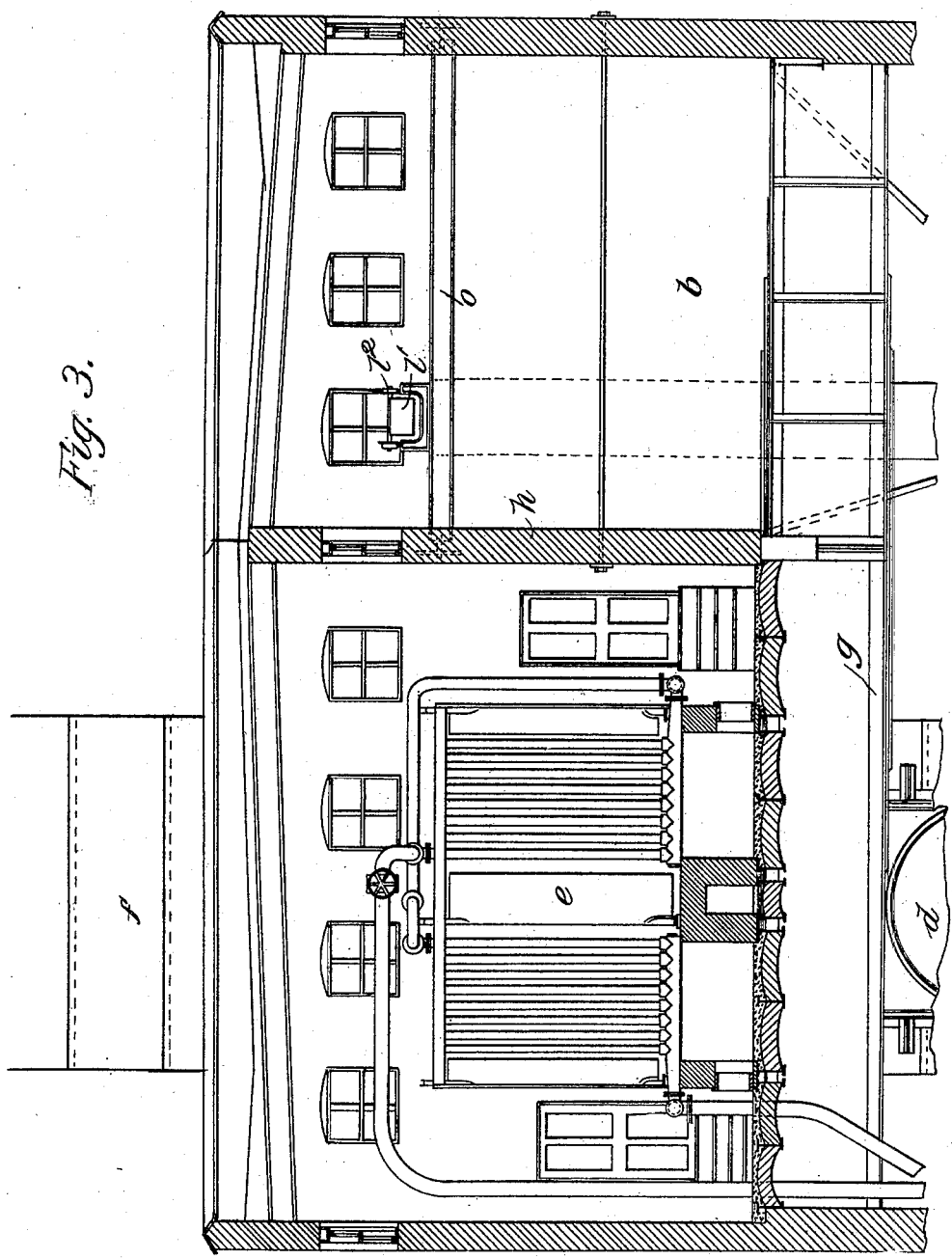
Figure 4:
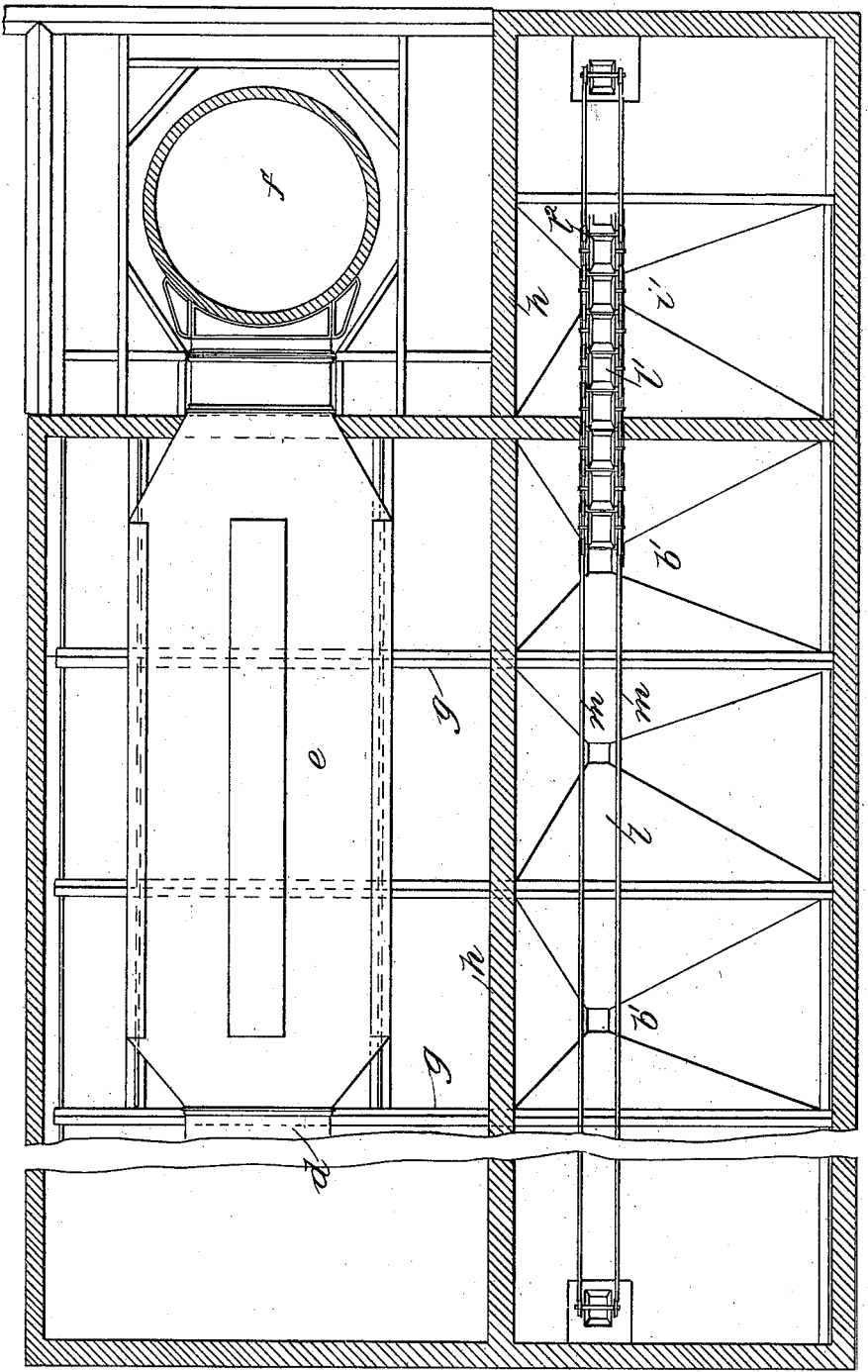
Figure 5:
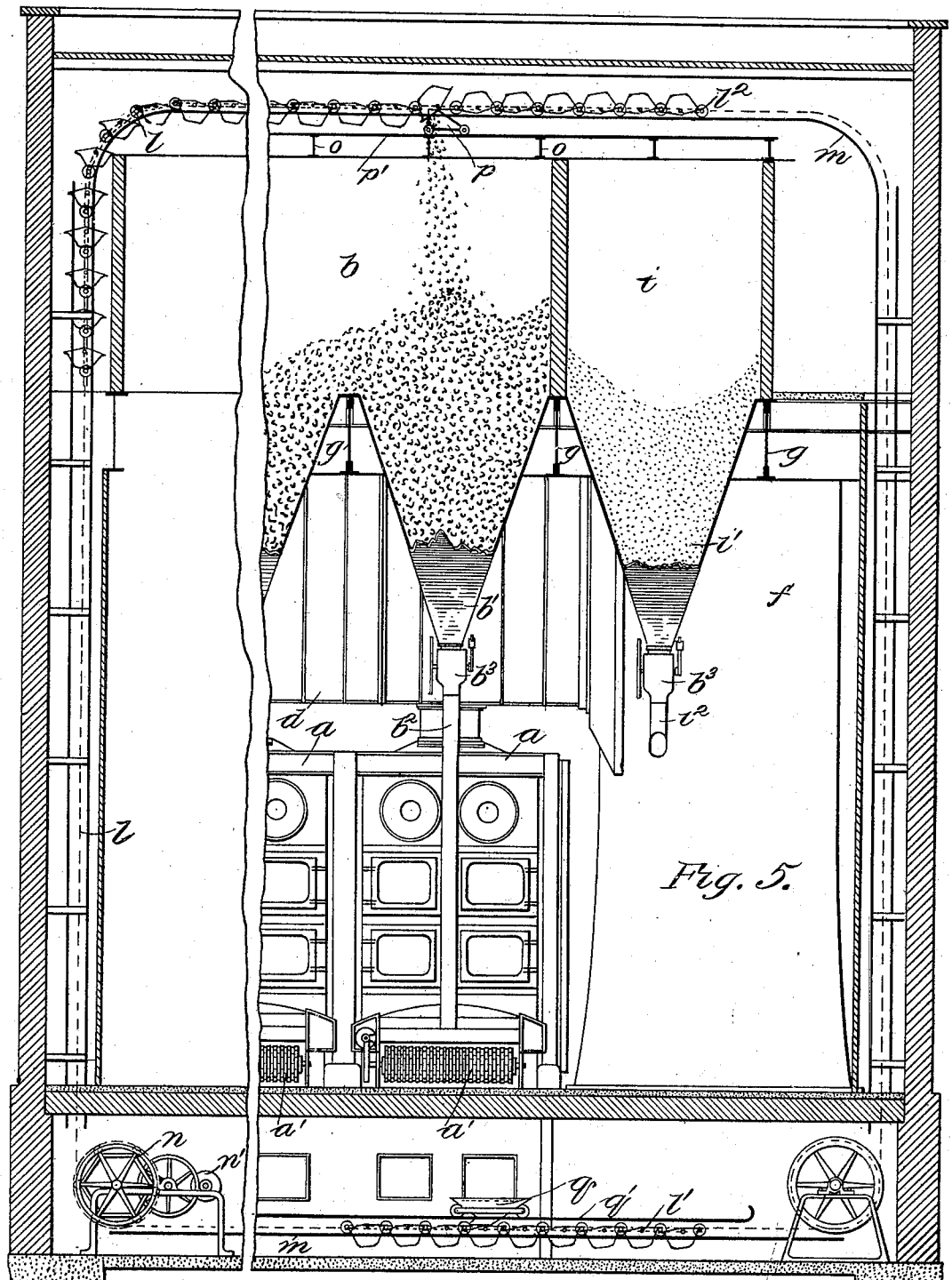

Figure 1 is a transverse sectional elevation of a power-station constructed and equipped in accordance with my invention. Fig. 2 is a similar view of a portion of the boiler-room, illustrating also the coal-crusher and the cross-conveyer connecting with the main conveyer in the basement of the boiler-house. Fig. 3 is a transverse sectional elevation of the upper floor of the boiler-house with its contained parts. Fig. 4 is a sectional plan view of the upper portion of the boiler-house, showing the coal-bunker and the ash-bunker, with their funnels hung from the transverse girders and also indicating the main conveyer passing over the bunkers. The fuel-economizer and the stack are also illustrated. Fig. 5 is a longitudinal sectional elevation of the boiler-house, showing the front of a battery of two boilers and indicating a portion of the coal-bunker and ash-bunker. The main conveyer is shown most clearly in this figure. Fig. 6 is a sectional plan view on line 6 6 of Fig. 2, indicating the ash-pits under the boilers and the main conveyer passing along in front of them, together with the movable hopper for receiving the ashes and the coal-crusher and the cross-conveyer; and Fig. 7 is a plan view of the boiler-house, showing the arrangement of the boilers and the positions of the transverse girders relatively thereto.

Similar letters of reference are used to designate the same parts wherever they are shown.

A complete power-station is shown in Fig. 1, having an engine-room and a boiler-house adjacent thereto for supplying steam for the engines. The boiler-house is shown in the right-hand part of the figure, and it is to this part of the power-station that particular attention is directed.

The boilers $a\,a$ may be arranged in batteries of two in a row along the boiler-room, leaving a space wide enough to draw the boiler-tubes along in front of the boilers and for the attendants to walk to and fro. Mechanical stokers $a'\,a'$ are associated with the boilers. These may be of any desired form. I prefer, however, to use the type of stoker generally known as the "chain-grate," which, as its name implies, consists of an endless band made up of links joined to one another, passing underneath the front of the boiler and forming, in effect, a movable grate. Rollers are provided at either end, over which the chain-grate is passed, one of these being rotated by suitable mechanism, and a trough or hopper in front of the boiler serves to receive the coal which the slow forward movement of the chain-grate carries underneath the boiler, where it is consumed. As soon as the coal reaches the end of the grate the continued movement of the latter throws off the ash into the ash-pit $a^2$ below. It will be understood, then, that it is only necessary to keep the trough of each stoker filled with coal to insure continuous stoking, and the supply of coal is obtained from the funnels $b'$ of the coal-bunker by means of coal chutes or pipes $b^2\,b^2$, extending from the lower end of each funnel to the trough or hopper of each mechanical stoker. Valves $b^3\,b^3$ are provided in the coal-chutes for controlling the passage of coal therethrough.

The boilers $a\,a$ may be of any approved type. I have, however, illustrated water-tube boilers of a construction which is well known and does not require particular description. Pipes $c\,c$ extend from the boilers to the main pipe $c'$, from which the steam is conveyed to the engines.

The smoke and heated gases from the boiler-furnaces pass into a flue $d$, extending longitudinally of the boiler-room above the rear ends of the row of boilers, and from thence they pass to the fuel-economizer $e$. This consists, essentially, of a series of pipes through which the feed-water is passed, these pipes being arranged to be heated by the gases and heated products of combustion on their way to the chimney-stack $f$. Economizers of this type are well known in the art, and I do not consider it necessary to enter into a detailed description of them here.

The economizer is placed overhead, above the rear of the boilers, and is supported upon a series of transverse beams or girders $g\,g_1$ which extend across the boiler-house from wall to wall in the direction of the length of the boilers. These girders are located at regular intervals one between each battery of boilers and one above the center of each battery, as indicated most clearly in Fig. 7, and besides sustaining the weight of the fuel-economizer serve as supports from which the coal-bunker funnels leading to the mechanical stokers of each battery of boilers are hung. A partition $h$ is built upward from the cross-girders $g\,g$ longitudinally of the boiler-room on a line above the front of the row of boilers, forming the economizer-room on one side, above the row of boilers, and the bunker-room on the other side, above the open space in front of the boilers. The bunker-room is thus comparted at the bottom by the series of cross-girders and has no floor except that which is formed by the funnels or bunkers extending downwardly between the girders. The bunkers or funnels are preferably in the form of inverted hollow rectangular pyramids whose bases are riveted to the upper edges of the girders—that is to say, the mouths of the funnels placed side by side occupy the whole bottom of the bunker-room.

Referring to Figs. 4 and 5, it will be seen that at the right-hand end of the bunker-room a partition is provided, extending upwardly from one of the transverse girders $g\,g$ nearly to the top of the bunker-room and serving to divide off a small portion of the room to serve as an ash-bunker $i$. The funnel $i'$, which forms the bottom of the ash-bunker, is connected with a chute or pipe $i^2$, which extends diagonally through the open space in the boiler-room to the exterior of the building, preferably to a point above the railroad-track $k$, so that the ashes from the bunker $i$ may be discharged from the chute directly into a car standing upon the railroad-track and carried away.

As illustrated most clearly in Fig. 5, a conveyer $l$ extends in the form of an endless chain entirely around the boiler-room, passing along the top of the bunker-room, down the side walls of the building, and along under the floor of the boiler-room immediately in front of the ash-pits $a^2$. This conveyer is of the kind known as the "gravity-bucket-overlapping conveyer" and consists of a number of buckets $l'$, hung upon trunnions in rectangular frames, which are joined to one another end to end and mounted upon rollers or wheels $l^2$, rolling along the tracks $m\,m$. The conveyer is thus in the form of a very large sprocket-chain having a bucket in each link thereof.

Motor mechanism is illustrated in the lower left-hand corner of Fig. 5, which consists, essentially, of a large sprocket-wheel $n$, of suitable size for meshing with the links of the conveyer, driven by a motor $n'$. Considering that the motor is driven in a direction to move the sprocket-wheel in a clockwise direction, as seen in Fig. 5, it will be evident that a bucket in the basement of the boiler-house will travel to the left around the sprocket-wheel and up the left-hand side wall of the building until it nearly reaches the roof, at which point the track $m$ curves and extends along underneath the roof above the coal-bunker $b$ and, as it travels farther, above the ash-bunker $i$, whence it will descend again, following the track down the right-hand wall of the building. The buckets are hung upon trunnions, so that in ascending they will remain in an upright position to retain their load regardless of the angular positions assumed by the frames in which the conveyer-buckets are mounted.

The tracks $m$ $m$ of the conveyer, passing above the bunkers, are supported upon I-beams $o$ $o$, which extend at intervals across the bunker-room. These I-beams also support the track $p'$, upon which the rolling dump-block $p$ is adapted to travel. This dump-block, as its name indicates, is a device which is adapted to engage the buckets of the conveyer as they travel and overturn them, causing their contents to be discharged. It may be adjusted at any point along the track $p'$, so that the buckets when used to carry coal may be caused automatically to dump the same at any desired place in the coal-bunker, and when the conveyer is used to carry ashes the dump-block may be adjusted to dump them into the ash-bunker.

I will now consider the means by which the conveyer is loaded with its freight of coal and ashes. This is done in the basement under the boiler-room. A track $q'$ extends along the front of the ash-pits $a^2$ $a^2$, upon which track a truck carrying a hopper $q$ is adapted to travel. The hopper is of such shape that it will run close to the ash-pit, and the opening in its bottom is immediately above the conveyer $l$. The hopper may therefore be run along the track $q'$ and adjusted opposite an ash-pit which it is desired to empty, and the ashes may then be raked directly into the hopper, from which they will fall into the traveling buckets $l'$ of conveyer $l$. The dump-block $p$ in this instance is of course adjusted so as not to overturn the buckets until they reach a point above the ash-bunker. It will be understood then that the ashes will be carried up the side of the building and along the bunker-room until they reach the dump-block, at which point the buckets will be inverted and the ashes will fall into the ash-bunker $i$. The ashes may from time to time be removed from the ash-bunker through the funnel $i'$ and chute $i^2$ and discharged into an ash-car standing upon the railroad-track $k$.

An excavation or extension of the basement of the boiler-house is dug outwardly from the basement to a place underneath the railroad-track $k$, and a coal-crusher $r$ is located in this excavation, a larger hopper or funnel $r'$ being built up from the crusher on either side of the railroad-track, so that the coal brought in cars on the track $k$ may be unloaded directly into the hopper of the coal-crusher. A cross-conveyer $s$ of the same general nature as the main conveyer $l$ serves to receive coal from the coal-crusher. This cross-conveyer extends under the floor of the boiler-room, connecting with the main conveyer—that is to say, it is arranged so that its buckets will be tilted when they reach a point over the main conveyer, and their contents will thus be transferred to the main conveyer. The hopper $q$ may be used in this connection to direct the coal into the buckets of the main conveyer as it falls from the cross-conveyer.

The whole structure may be considered as a great machine for the generation of steam from the combustion of coal, the operation of which may be traced as follows:

A car of coal is drawn along the railroad-track $k$ to a point immediately above the hopper $r'$ of the coal-crusher $r$. Here the coal is unloaded and falls directly into the coal-crusher, where the larger lumps are broken and the whole reduced to a size suitable for use with the mechanical stokers of the plant. After passing through the crusher the coal falls into the buckets of the cross-conveyer $s$ and is carried into the basement of the boiler-room, where it is dumped into the hopper $q$, and from thence falls into the buckets of the traveling conveyer $l$. From here it travels to the top of the building and is dumped above one of the funnels of the coal-bunkers. The valves in the coal-chutes being opened, the coal is permitted to fall through the chutes into the hoppers. Here the coal falls upon the chain-grate and is carried slowly into the furnaces under the boilers, whence the smoke and heated products of combustion are led to the flue $d$, from whence they pass into the stack $f$ by way of the economizer $e$, thus heating the feed-water for the boilers. As the chain-grate of the mechanical stokers continues to operate the ashes are thrown down into the ash-pits $a^2$, from whence they are raked by an attendant into the hopper $q$, then falling into the buckets of the conveyer $l$. When the conveyer $l$ is used to dispose of the ashes, it of course carries no coal at all, the feeding of coal to it by the cross-conveyer $s$ having been stopped. The dump-block $p$ having been adjusted above the ash-bunker, the ashes carried by the conveyer $l$ thus pass over the coal-bunkers and are dumped finally into the ash-bunker, from which they may be finally removed through the ash-chute $i^2$ into an ash-car upon the track $k$.

It will be appreciated that the construction above described is very compact and takes up but little ground-space, which feature is especially valuable in large cities.

Having thus described my invention, what I claim as new, and desire to secure by Letters Patent, is—

1. In a power-station structure and system, the combination with a boiler-house and a row of boilers arranged in batteries, with two boilers to each battery, of a series of transverse girders extending across the boiler-house above the boilers, the said girders being disposed at intervals, one above the center line of each battery and others above the center lines between the batteries, of a series of coal-bunkers $b'$ $b'$ extending downwardly in the spaces between the girders and supported from the upper edges thereof, mechanical stokers for the boiler-furnaces, and coal chutes or pipes leading from the coal-bunkers to the mechanical stokers, substantially as set forth.

2. In a power-station system, the combination with a boiler-house and a series of boilers disposed transversely thereof and forming a row longitudinally of the boiler-house, of a series of transverse girders extending from wall to wall across the boiler-house above the boilers and in alinement therewith, a series of coal-bunkers $b'$ $b'$ extending downwardly in the spaces between the girders and supported thereby, mechanical stokers associated with the boilers and coal-chutes leading from the bunkers to the mechanical stokers, a fuel-economizer $e$ supported by the girders above the rear ends of the row of boilers, and means for conveying the products of combustion from the boiler-furnaces through the economizer, substantially as set forth.

3. The combination with a boiler-house structure having a series of transverse girders extending entirely across the same in the direction of its width and forming an upper floor, of a single partition supported by the girders extending transversely thereof and longitudinally of the boiler-house, dividing the upper story into two compartments, a fuel-economizer $e$ in one of said compartments, and coal bunkers or funnels hung from the girders and suspended in the spaces between them, whereby the compartment above the said funnels forms a bunker-room whose bottom is comparted by the girders, the spaces between which form the mouths of said funnels, substantially as set forth.

4. The combination with a series of boilers arranged in batteries side by side, with two boilers to each battery, of a series of transverse girders extending from wall to wall across the structure above the boilers and in alinement therewith, the said girders being disposed at intervals above the center lines of the batteries and above the center lines between the batteries, a fuel-economizer supported by the said girders above the boilers, a series of coal bunkers or funnels, one for each boiler, suspended from the said girders and extending downwardly between the same into the boiler-room in front of the row of boilers, the mouths of said funnels thus occupying the spaces between the girders, mechanical stokers for the boiler-furnaces, coal-chutes extending from the funnels to the mechanical stokers, and means for conveying the heated products of combustion to the fuel-economizer, substantially as set forth.

5. In a power-station structure and system, the combination with a row of boilers and a boiler-house containing them, the boiler-house having a series of transverse girders extending from wall to wall across the same above the boilers, the said girders being disposed at intervals above the center lines of the batteries and above the center lines between the batteries, of a partition built upon the girders longitudinally of the building and dividing the upper portion thereof into two compartments, one of which compartments is located above the rear of the boilers, the other compartment being above the space in front of the boilers, a fuel-economizer in the rear compartment and means for conveying the heated products of combustion from the boiler-furnaces to the said fuel-economizer, and coal bunkers or funnels suspended in the spaces between the girders at the bottom of the front compartments, the spaces between the girders from the wall of the building to the partition forming the mouths of the said funnels and coal-chutes leading from the funnels, substantially as set forth.

6. The combination with a series of boilers, of a series of bunkers disposed above the boilers, chutes for withdrawing coal from the bunkers, ash-pits for the boiler-furnaces below the floor of the boiler-room, a conveyer $l$ extending completely around the structure above the bunkers at the top and in front of the ash-pits at the bottom, a railroad-track $k$ extending alongside of the building, a coal-crusher disposed beneath the railroad-track and having a hopper adapted to direct coal which may be discharged from cars into the coal-crusher, and a cross-conveyer for carrying coal from the coal-crusher to the said main conveyer, substantially as set forth.

7. In a power-station, the combination with a series of boilers disposed side by side and forming a row, said boilers being arranged in batteries, of mechanical stokers associated with the boiler-furnaces, a series of girders $g$ $g$ supported above the front of the row of boilers and extending transversely to the row, parallel with the individual boilers, said girders being located above the center lines of the batteries and above the center lines between the batteries, a series of coal bunkers or funnels $b'$ $b'$ disposed in the spaces between the transverse girders and suspended therefrom, and pipes or chutes $i^2$ $i^2$ leading from the funnels to the mechanical stokers, substantially as set forth.

8. The combination with a series of boilers disposed side by side and forming a row, of a series of coal-bunkers arranged side by side above and in front of the boilers for supplying coal to the boiler-furnaces, an endless conveyer extending above the coal-bunkers and in front of the ash-pits, an ash-bunker at the end of the row of coal-bunkers, and an ash-chute leading from the ash-bunker to the exterior of the boiler-house, substantially as set forth.

9. The combination with a series of boilers arranged side by side and forming a row, of mechanical stokers for the said boilers, a series of coal-bunkers disposed above and in front of the boilers and having chutes for conveying coal to the mechanical stokers, ash-pits below the boiler-furnaces, a track in front of the ash-pits, a traveling hopper adapted to be moved to and fro in front of the openings of the ash-pits for receiving ashes therefrom, an endless conveyer $l$ passing over the coal-chutes and in front of the openings in the ash-pits below the said track, whereby the hopper is adapted to direct ashes into the conveyer, a coal-crusher, and a cross-conveyer adapted to carry coal from the coal-crusher to said main conveyer $l$, substantially as set forth.

In witness whereof I hereunto subscribe my name this 26th day of September, A. D. 1899.

FREDERICK SARGENT.

Witnesses:
GEORGE P. BARTON,
JAMES. F. GRAY.